: US009537296B2

United States Patent
Park et al.

(10) Patent No.: US 9,537,296 B2
(45) Date of Patent: Jan. 3, 2017

(54) CABLE RETAINER AND METHOD

(71) Applicants: Do Seo Park, Houston, TX (US); Luis E. Mendez, Houston, TX (US)

(72) Inventors: Do Seo Park, Houston, TX (US); Luis E. Mendez, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/729,323

(22) Filed: Jun. 3, 2015

(65) Prior Publication Data

US 2016/0359310 A1 Dec. 8, 2016

(51) Int. Cl.
*H02G 15/00* (2006.01)

(52) U.S. Cl.
CPC ..................... *H02G 15/00* (2013.01)

(58) Field of Classification Search
CPC .... H02G 15/00; H02G 15/007; H02G 15/064; H02G 15/068; H02G 3/00; H02G 3/22; H02G 3/26; H02G 1/088; F16L 7/00; F16L 3/227; F16L 3/13
USPC ....... 174/40 CC, 135, 68.1, 72 A, 654, 74 R, 174/88 R, 70 C, 95; 248/49, 68.1, 74.2, 248/74.1, 71
See application file for complete search history.

(56) References Cited

U.S. PATENT DOCUMENTS

| | | | | |
|---|---|---|---|---|
| 1,668,953 A | * | 5/1928 | Erickson | H02G 3/0487 174/70 C |
| 4,119,285 A | * | 10/1978 | Bisping | F16L 3/13 248/74.2 |
| 4,870,722 A | * | 10/1989 | Shell, Jr. | H02G 3/26 248/74.1 |
| 5,018,260 A | * | 5/1991 | Ziu | F16L 7/00 248/49 |
| 6,216,987 B1 | * | 4/2001 | Fukuo | F16L 3/227 248/74.2 |
| 6,489,569 B1 | * | 12/2002 | Thomson | H01B 17/145 248/71 |
| 6,641,093 B2 | * | 11/2003 | Coudrais | F16L 3/13 248/68.1 |
| 6,644,892 B2 | * | 11/2003 | Nishiwaki | H02G 1/088 174/40 CC |
| 7,608,782 B2 | * | 10/2009 | Hill | H02G 3/32 248/74.2 |
| 7,866,405 B2 | | 1/2011 | Richards et al. | |
| 2011/0297376 A1 | | 12/2011 | Holderman et al. | |
| 2012/0024545 A1 | | 2/2012 | Kuo | |

* cited by examiner

*Primary Examiner* — Angel R Estrada
(74) *Attorney, Agent, or Firm* — Cantor Colburn LLP

(57) ABSTRACT

A cable retainer for a downhole tubing string includes a body; a detent extending from the body; a relief between the detent and the body facilitating deflection of the detent to allow passage of a cable; and a detent lip extending from the detent. A method for securing a cable to a tubular.

10 Claims, 2 Drawing Sheets

CABLE RETAINER AND METHOD

BACKGROUND

In the drilling and completion industry, trends are toward more and more information about real time conditions downhole. Fiber optic and other cables are used to provide such information. In order for cables to be effective and protected however, it is generally necessary to secure the cables to the string being run in the hole using one or more retainers. Sometimes, securement needs to be across a sand screen and as a subset, while some cables are distributed temperature sensing (DTS) others may also monitor sand screen deflection as well. Securement for this subset requires that a retainer more rigidly maintain the cable. While some methodologies and configuration have been tried, the art is always receptive to simpler or more effective configurations.

BRIEF DESCRIPTION

A cable retainer for a downhole tubing string includes a body; a detent extending from the body; a relief between the detent and the body facilitating deflection of the detent to allow passage of a cable; and a detent lip extending from the detent.

A method for securing a cable to a tubular includes aligning a cable section with a retainer; urging the cable against the retainer at a portion thereof to cause a detent to deflect into a relief allowing passage of the cable; and allowing the detent to rebound to a natural position with a lip overhanging the cable.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
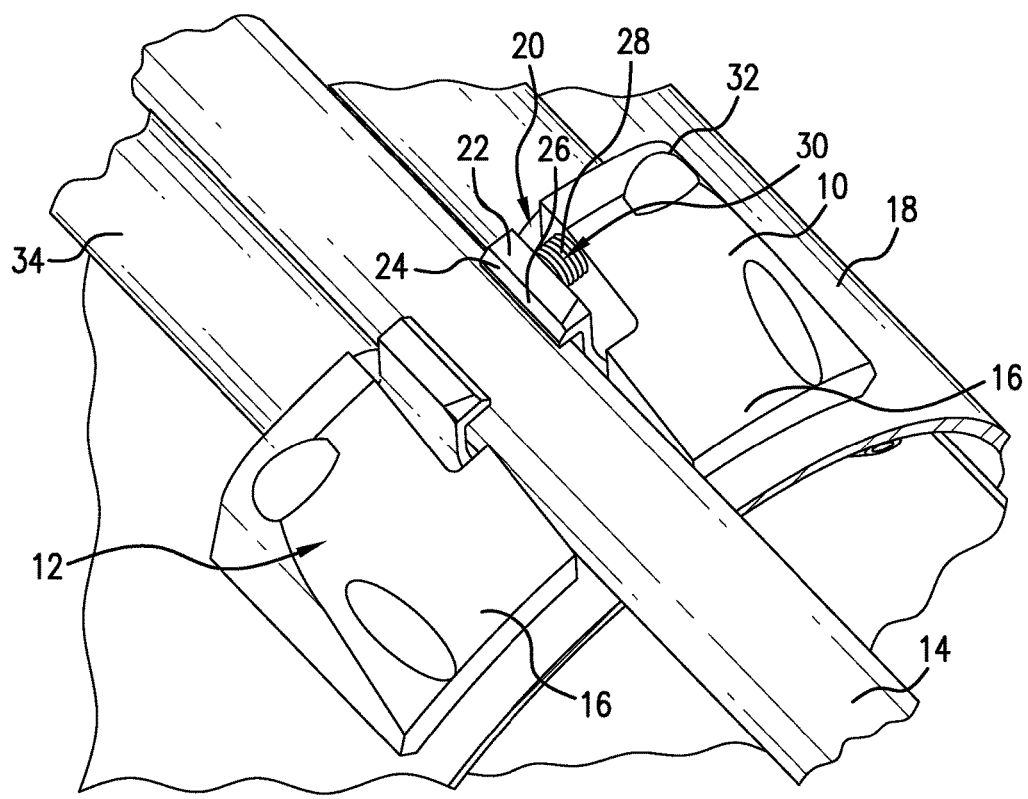
FIG. 1 is a perspective view of a retainer as described herein.

Referring to FIG. 1, a retainer 10 is illustrated with a mirror image retainer 12 positioned in operable proximity thereto. While the discussion herein will relate to the figure and hence both of retainers 10 and 12, it is to be appreciated that either of the retainers may be used independently of the other providing some structure exists opposite one of the retainers against which a cable 14 may be urged. Further, as the retainers 10 and 12 are mirror images of each other, numbering and identification will be focused upon one of them with the recognition that each of the numerals and description apply to both. Retainer 10 comprises a tapered block body 16 that acts to provide affixation to a tubular body 18 as well as presenting a bumper to protect the cable 14. The tapered configuration as shown helps to avoid the body 16 impacting a structure downhole with enough force to remove the body 16 from the tubular 18. Affixation may be effected by fasteners, adhesives, welding, straps, etc. Retainer 10 also includes a relief area 20 that provides for deflection of a detent 22 in order to allow the cable 14 to pass a detent lip 24. It should be appreciated that detent lip 24 has a chamfered surface 26 to aid in insertion of the cable 14 past the detent 22 during engagement of the cable 14 to the retainer 10. In other words, after aligning the cable with the retainer 10, urging of the cable toward the tubular 18 will cause the cable to contact the chamfered edge and deflect the detent into the relief 20, thereby allowing the cable to pass the detent.

Figure 3:
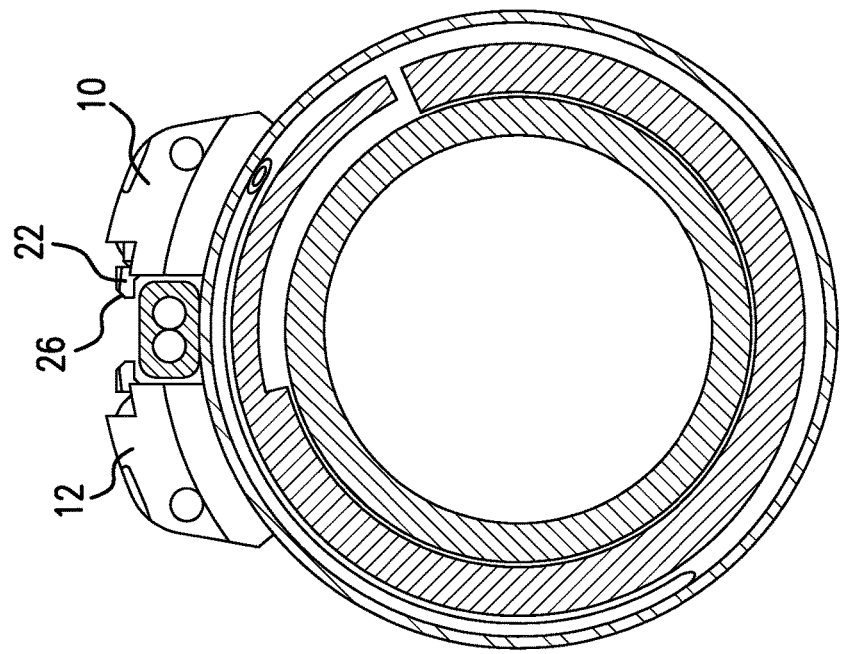
FIG. 3 is a representation similar to that of FIG. 2 but with the cable shown in an engaged position.
Figure 2:
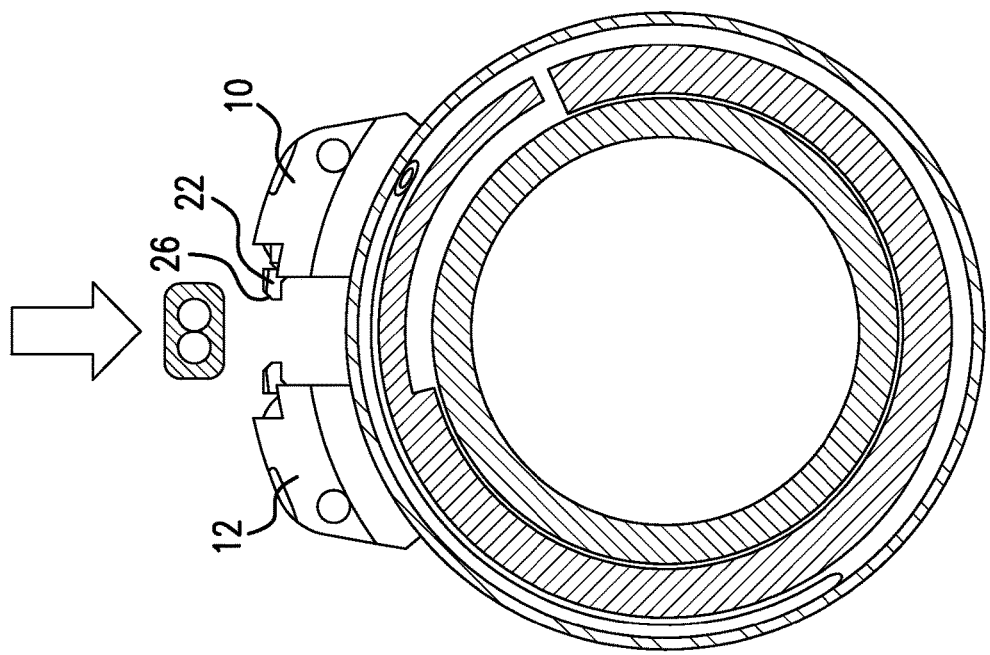
FIG. 2 is a representation of a tubular string with the retainer of FIG. 1 illustrated thereon and a cable prior to engagement.

The relief 20 into which the detent 22 deflects to allow passage of the cable 14 may in some embodiments present the possibility for escape of the cable 14 at an undesirable time. Accordingly in one embodiment, a relief occupier 28 is added to the retainer to prevent deflection of the detent 22 other than at times when such deflection is desired. As illustrated, the occupier 28 is a threaded member 30 that is introduced to retainer 10 through opening 32. In one iteration, the threaded member 30 is a set screw. In any event, the occupier 28 is adjusted to occupy at least a portion of the volume into which the detent 22 may otherwise deflect thereby limiting or preventing that deflection and ensuring that the detent 22 remains engaged with the cable 14. When the cable 14 is engaged with the retainer, the detent lip 24 overhangs the surface of the cable 14 as can be easily seen in FIG. 3 to prevent the cable moving radially outwardly from the tubular 18. The detent is then allowed to rebound to its natural position placing the detent lip over the cable.

Where two of the retainers, such as retainer 10 and 12 are used together, they operate in the same way as described above but in opposite directions and retain cable 14 as illustrated in FIGS. 1-3. A benefit of the retainer disclosed herein is that it is effective not only for cables such as DTS cables where the cable is not used for measuring deformation of the tubular but also for deformation measuring cables which require a more rigid affixation to the tubular in order to properly and reliably sense deformation of the tubular or screen over which the cable 14 runs.

As can be seen in FIG. 1, the retainers may be paired with bumpers 34 to further protect the cable 14 from impact during running. Bumpers may be of any convenient material including metals, polymers, etc.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A cable retainer for a downhole tubing string comprising:
    a first body configured to be fixedly attached to the downhole tubing string and a second body configured to be, independently of the first body, fixedly attached to the downhole tubing string in spaced relation to the first body;
    a detent extending from at least one of the first and second bodies toward the other of the first and second bodies;
    a relief between the detent and the body from which it extends facilitating deflection of the detent to allow passage of a cable; and
    a detent lip extending from the detent.

2. The cable retainer as claimed in claim 1 further comprising a chamfered edge on the detent lip.

3. The cable retainer as claimed in claim 1 further comprising an occupier for the relief, the occupier limiting deflection of the detent into the relief.

4. The cable retainer as claimed in claim 3 wherein the occupier is a threaded member.

5. The cable retainer as claimed in claim 4 wherein the threaded member is a set screw.

6. The cable retainer as claimed in claim 1 wherein the body includes an opening for through passage of the occupier.

7. A method for securing a cable to a tubular comprising:
    aligning a cable section with the retainer as claimed in claim 1;
    urging the cable against the retainer at a portion thereof to cause a detent to deflect into a relief allowing passage of the cable; and
    allowing the detent to rebound to a natural position with a lip overhanging the cable.

8. The method as claimed in claim 7 wherein the urging includes contacting the cable against a chamfered edge of a detent lip to cause the detent to deflect.

9. The method as claimed in claim 7 further comprising installing an occupier to prevent deflection of the detent.

10. The method as claimed in claim 9 wherein the installing of the occupier is threading the occupier into an opening in the retainer thereby limiting deflection of the detent.

* * * * *